United States Patent [19]
Drab

[11] 3,843,291
[45] Oct. 22, 1974

[54] APPARATUS FOR MOLDING RUBBER
[75] Inventor: Edward H. Drab, Naugatuck, Conn.
[73] Assignee: Uniroyal, Inc., New York, N.Y.
[22] Filed: Oct. 14, 1971
[21] Appl. No.: 189,200

Related U.S. Application Data
[62] Division of Ser. No. 863,652, Oct. 2, 1969, abandoned.

[52] U.S. Cl.......... 425/215, 425/DIG. 806, 425/219
[51] Int. Cl...... B29c 29/00, B29f 1/00, B29h 19/00
[58] Field of Search .......... 425/806, 130, 119, 218, 425/215

[56] References Cited
UNITED STATES PATENTS

| | | | |
|---|---|---|---|
| 1,195,204 | 8/1916 | Gleason | 425/806 UX |
| 2,148,079 | 2/1939 | Martin | 425/806 UX |
| 3,160,921 | 12/1964 | Ludwig | 425/119 X |
| 3,499,190 | 3/1970 | Ludwig | 425/119 |
| 3,608,151 | 9/1971 | Cloutier et al. | 425/119 |

FOREIGN PATENTS OR APPLICATIONS

| | | | |
|---|---|---|---|
| 1,120,885 | 7/1968 | Great Britain | 425/119 |

Primary Examiner—J. Spencer Overholser
Assistant Examiner—Michael O. Sutton
Attorney, Agent, or Firm—Henry Sternberg, Esq.

[57] ABSTRACT

A method and apparatus for molding rubber. Unvulcanized rubber is placed in a mold cavity. A movable mold member located opposite an article to which the rubber is to be molded is advanced toward the article until the rubber is spread against the article.

The movable member is provided with a peripheral outwardly extending lip for forming, in the rubber flash escaping around the periphery of the movable mold member, a peripherally extending weakened region. A peripherally extending recessed region is also provided in the sole plate adjacent the lip for forming the flash rubber escaping past the lip into a bead shape.

After the rubber has partially set and become vulcanized to the article the movable mold member is retracted away from the article simultaneously entraining therewith the said bead in the recessed region thereof and thus tearing the rubber flash along the weakened region so as to separate the bead portion from the remaining molded portions of the rubber material.

4 Claims, 5 Drawing Figures

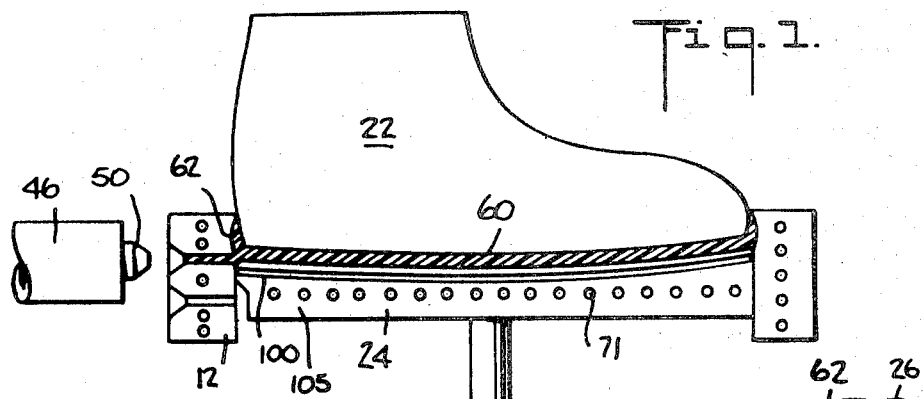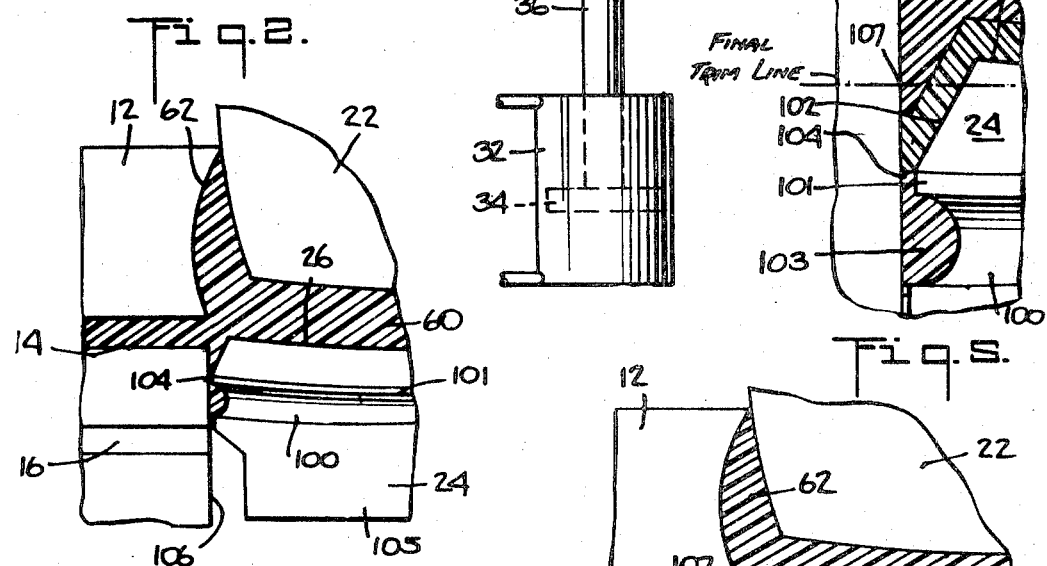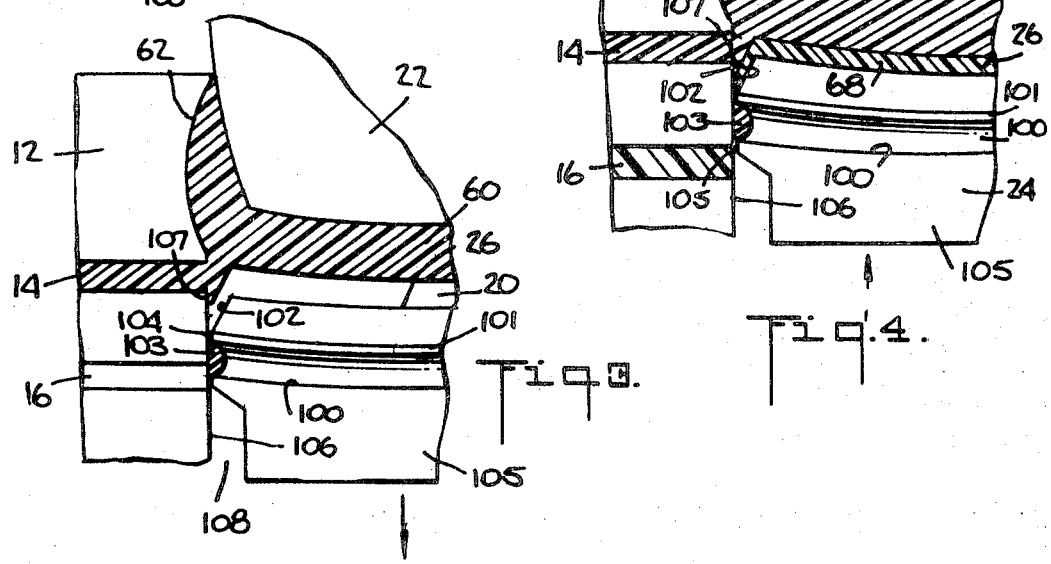

APPARATUS FOR MOLDING RUBBER

This is a division of application Ser. No. 863,652, filed Oct. 3, 1969, and now abandoned.

BACKGROUND OF THE INVENTION

This invention relates to the molding of rubber. In particular, the present invention relates to injection molding of rubber for rubber-soled footwear and especially to injection molding of a two-color rubber soled footwear construction.

The present invention constitutes a further modification of the method and apparatus described in copending U.S. Pat. application Ser. No. 729,570, filed May 16, 1968, now U.S. Pat. No. 3,608,004, granted Sept. 21, 1971, and assigned to the assignee of the present invention. The latter patent application is hereby incorporated herein, by reference, in its entirety.

As was noted in said co-pending application difficulties are encountered, particularly when making soles with two differently colored rubber materials, in achieving a sharp, well-defined boundary between the foxing and the outsole, because of the difficulty in preventing the first-injected foxing rubber from undesirably mixing with the second-injected outsole rubber.

It is, therefore, an object of the present invention to provide a modified method and apparatus which is capable of achieving a clean, sharply-defined junction between the outsole and the surrounding foxing.

It is a further object of the present invention to provide a method and apparatus of the type described above which is capable, prior to injection of the second color rubber material, of automatically removing the "flash" resulting from the first injected rubber from the region of the mold in which undesired intermixing of colors might occur. It is also an object of the present invention to provide a method and apparatus for easily and economically removing the "flash" resulting during rubber molding.

With respect to those features of the present invention which are substantially identical to corresponding features described in said co-pending application reference should be had to the latter application for more detailed explanation. In this connection it will be noted that corresponding parts in this and in said co-pending application have the same reference numberals.

According to one embodiment of the present invention a first rubber for the foxing and midsole is injected into a mold cavity in which a movable sole plate spreads the injected first rubber against the underside of a lasted upper. The pressure required for this spreading operation unavoidably results in some rubber, in the form of "flash," escaping around the periphery of the sole plate. The sole plate is provided at its periphery with a circumferential lip extending toward and into close proximity to the side mold rings within which the sole plate moves. A circumferentially extending groove, provided below the lip, collects some of the flash rubber which escapes past the lip during the first spreading operation. After this first rubber has set sufficiently to provide a clean retraction of the sole plate without any sticking of the first-injected material thereto, the sole plate is retracted away from the midsole to form between itself and the mid sole a mold cavity suitable for injection of the second, i.e., outsole rubber. During this retraction, the portion of the first injected rubber collected in the peripheral groove of the sole plate is forced to move with the latter thus being torn from the remainder of the first injected rubber along a predetermined peripherally extending line, i.e., along the line formed by the outwardly extending lip and thus being the thinnest and therefore weakest region of the downwardly depending flash rubber. After the "flash" resulting from the first injection is thus severed and moved out of the way by the sole plate, the second rubber is injected into the mold cavity. Substantially all of the flash of the first injected rubber is thus removed automatically from the region of potential intermix prior to injection of the second rubber. The sole plate is then again advanced toward the lasted upper to spread the second, i.e., outsole-rubber against the midsole-rubber to be vulcanized thereto.

The configuration of the sole plate is such that the "flash" which is necessarily formed by some of the first rubber escaping intermediate the sole plate lip and the side rings in which the sole plate moves, is collected in the peripheral groove which extends around the sole plate at the underside of the lip. The portion of the flash rubber collected in the groove is formed therein into the shape of a bead.

By tearing the peripherally extending bead portion from the foxing during the aforesaid retraction of the sole plate not only is most of the flash removed but access to the second injection port is cleared of any overhanging flash of first injected rubber and the mold is thus automatically ready for the second injection. During the second upward movement of the sole plate for applying the second injected rubber outsole against the midsole, the rubber bead which is still located in the peripheral groove of the sole plate is once more entrained to move therewith thus substantially preventing the second injected flash rubber from escaping between the sole plate and the side rings past the region of the peripheral groove.

With this construction and method it has been found that intermixing of the outsole material with the foxing material at the outsole-foxing junction is substantially eliminated. Any intermixing which does occur, using the process of the present invention, is restricted to regions below what will ultimately (i.e., after trim) be the lowermost portion of the downwardly depending foxing material i.e., such intermix is restricted to the region below the plane at which trimming takes place. There is thus assured a clean, sharply defined junction line between the outsole and the foxing. It is, therefore, possible to manufacture a two-color rubber sole structure in a highly efficient manner with the method and apparatus of the invention.

BRIEF DESCRIPTION OF DRAWINGS

The invention is illustrated by way of example in the accompanying drawings which form part of this application and in which:

FIG. 1 is a schematic representation of the structure according to the present invention, subsequent to the first injection and after the sole plate has been advanced toward the lasted upper to spread the midsole-foxing component against the upper;

FIG. 2 is a fragmentary sectional elevation, on an enlarged scale, as compared to FIG. 1, taken in a vertical plane through the heel region of the mold and showing in detail the condition of the injected material and features of the apparatus of the invention when the parts are in the condition shown in FIG. 1;

FIG. 3 is a fragmentary sectional elevation, on an enlarged scale, as compared to FIG. 1, taken in a vertical plane through the heel region of the mold, showing the condition of the first injected material after the sole plate has been retracted away from the upper subsequent to applying the first injected material to the upper;

FIG. 4 is a fragmentary sectional elevation, on an enlarged scale, as compared to FIG. 1, taken in a vertical plane through the heel region of the mold showing the condition of the injected material subsequent to raising of the sole plate to apply the second injected material to the first injected material; and FIG. 5 is a fragmentary sectional elevation on an enlarged scale, as compared to FIG. 4 showing in detail the lip and groove construction of the apparatus of the invention and the condition of the injected materials when the parts are in the position illustrated in FIG. 4.

DESCRIPTION OF PREFERRED EMBODIMENTS

Referring now to the drawings, the sole plate 24 of the apparatus according to the preferred embodiment of the invention includes a peripherally extending groove 100 formed in the side surface 105 thereof. Groove 100, which preferably, though not necessarily, has a semi-circular cross-section, open outwardly in the direction of the inwardly facing surface 106 of the side ring means 12. A sliding fit is provided between the peripheral surface 105 of sole plate 24 and the opposing surface 106 of the outer ring means 12. Thus the sole plate may slide freely within the ring means 12 toward and away from the lasted upper 22. The spacing between the slidingly engaging surfaces 105 and 106 is shown in exaggerated form in FIGS. 2 through 5 inclusive.

The top surface 26 of sole plate 24 preferably has a peripherally extending edge portion 102 preferably inclined at an angle in the range of approximately 18°–70° with respect to the vertical. A lip 101 is formed intermediate the groove 100 and the tapered surface portion 102 and preferably extends continuously about the periphery of the sole plate 24 toward and into close proximity of the surface 106 of the sidewall means, i.e., ring means 12. The outermost surface of lip 101 forms part of peripheral surface 105 and has a sliding fit relationship, as described above, with respect to the surface 106.

Thus, it will be seen that as the sole plate 24 moves upwardly toward the lasted upper 22 in order to apply the first injected rubber to the lasted upper in the form of a midsole 60, the flash produced by this action, i.e., the rubber which escapes around the periphery of the sole plate 24 into the small but nevertheless finite space between the relatively sliding sole plate 24 and outer ring means 12, finds its way past the lip 101 into the groove 100 provided for just such purpose.

It has been found that as a result of the application pressures required to be exerted on the rubber by the sole plate under practical operating conditions, the formation of some flash is unavoidable. Where only a single color rubber is injected, there is, of course, no mixing problem so that whatever flash is present could, if necessary, be readily trimmed off in a subsequent operation. Where, however, two-color injection is desired, intermixing of the flash of the first applied rubber with the rubber of different color injected in the second injection, has been a substantial problem. As described above, in accordance with the present invention, the flash rubber which escapes past the lip 101 finds its way into the groove 100 where it is collected until it at least partially fills the latter groove. In determining the amount of rubber to be injected during the first injection, it is preferred, according to the present invention, to provide sufficient rubber for filling the groove 100 in addition to the amount required for forming the desired midsole 60 and foxing 62.

After the first injected rubber has set sufficiently so that the midsole 60 will be vulcanized to the lasted upper 22 as well as to permit a clean separation of the upper surface 26 of sole plate 24 from the midsole 60, the sole plate 24 is retracted in a direction away from the lasted upper. This retraction movement, it will be seen, causes the rubber bead 103 formed within the groove 100 (FIG. 2) to be entrained by the sole plate and pulled downwardly therewith. The size, i.e., cross sectional area of the groove 100 and thus of the rubber bead 103 is chosen such that the bead will not be able to pass through the space between the outwardly projecting lip 101 and the surface 106 (FIG. 3) and therefore must move together with the sole plate 24.

As will be seen from FIG. 2, the outwardly projecting lip 101 having a width at its outermost edge preferably in the range of 1/32 to 1/8 inch and preferably extending to within 0.003 to 0.004 inches of the surface 106 of the mold rings, forms in the downwardly depending flash of first injected rubber a weakened, i.e., frangible, circumferentially extending portion generally indicated at 104. As the sole plate 24 is retracted carrying with it the rubber bead portion 103 trapped in the groove 100, the flash rubber will tear circumferentially along the weakened region 104. It will be seen that this weakened region 104 is located at least slightly above the second injection port 16. The tear will thus occur along a predetermined circumferentially extending line, the location of which is chosen such that substantially all of the flash material will be torn away from the lower edge portion 107 of the foxing. Intermix of the second injected material with the flash of the first injected material will therefore be confined to a region sufficiently spaced from the lower edge portion 107 of the foxing so as to be easily trimmed away during a subsequent operation.

After the sole plate 24, carrying the bead 103 with it, is retracted to a position such as illustrated in FIG. 6 of the co-pending application, namely, a position well below that illustrated in FIG. 3 herein, the second color rubber material is injected. Thereafter, the sole plate 24 is raised into a position in which it applies the second color rubber material to the lower surface of the midsole 60 (FIG. 4). In so doing, the flash which inevitably results from such application at high pressure will have difficulty escaping past the outwardly projecting lip 101 since the space between the lip and the mold rings, as well as the groove 100, are already filled with the flash of the first injected rubber material. Upward movement of the sole plate 24 into the FIG. 4 position thereof will, as previously described in the co-pending application, result in outwardly directed pressure against the inclined downwardly extending portion 107 of the foxing, thus keeping this foxing portion pressed against the surface 106 of the mold rings and preventing intermixing of the lower edges thereof with the newly injected second color rubber. That is, the inclined upper edge 102 of the sole plate acts to force the rubber in an outward and upward direction during the upward motion of the sole plate rather than in a pure upward direction, thereby reducing the tendency of the upward motion of the sole plate during application of the second injected rubber to the midsole to move any downwardly depending flash away from the wall 106 and into a location where it could intermix with the second color rubber material.

It is noted that a sole plate having the following dimensions, given here by way of example only, has proven highly effective in carrying out the present invention: The lip 101 has at its outer marginal edge a width of approximately 1/16 inch and is located approximately 9/32 inch below the top surface 26. The surface 102 is inclined 18 degrees with respect to the vertical, while the groove 100 has a semicircular cross-section having a radius of approximately 1/8 inch. The groove 100 and the inclined surface 102 respectively define opposed edges of the lip 101. The spacing between surfaces 105 and 106, namely the sliding fit between the sole plate and the mold rings, is approximately 0.003 inches. The foregoing structure is arranged so that the weakened portion 104 of the rubber material is located approximately along the lowermost edge of the V-shaped downwardly depending rubber portion 107. It will be understood that the groove 100 need not be semicircular in cross-section, but could be square, rectangular, V-shaped, or any other suitable shape, so long as it is able to collect therein rubber material of such size and/or shape that the latter will be entrained to move therewith.

Similarly, the lip 101 need not have the specific shape illustrated and could, for example, have a V-shaped, semicircular or other suitable cross-section the outermost portion of which extends close to the surface 106.

At the end of the second injection-compression molding step, and following sufficient time for cure, the mold components will have the relative position shown in FIG. 4. When the entire cycle is complete, side rings 12 are retracted and the complete shoe is pulled from the apparatus. In removing the shoe, the flash from the second injection-compression molding step may be torn from the shoe because of its attachment to the bead retained in groove 100. In the eventuality that when the shoe is removed from the mold the flash is not torn off in the manner just described, such flash may thereafter easily be torn from the shoe along the weakened section 104 of outsole rubber which connects the bead 103 to the outsole.

It will be understood, of course, that while the present invention has been illustrated with respect to a two-color injection method and apparatus such is by way of example only. The present invention can find suitable spplications also in the molding of rubber to articles other than shoes and also finds application where only a single color of rubber is used in the molding operation. In fact, for purposes of the present invention, it is not necessary that the rubber is admitted into the mold cavity by means of injection. Any other suitable means for depositing the rubber in the mold cavity would be acceptable. It is, therefore, not intended to limited the present invention to the manufacture of footwear, nor to applications where two different colors of rubber are used, nor to applications where the rubber is "injected" into the mold cavity. It will be seen that the apparatus according to the present invention will be useful wherever rubber material is to be molded to an article in a mold which is so arranged that the article itself defines part of the mold cavity, another apart of which is defined by a member which is movable toward the article for applying against the exposed surface of the article under pressure and under the influence of heat, the rubber deposited in the mold cavity.

In the preferred embodiment there is provided, in the heel area of the sole plate only, an undercut 108 which is located below the groove 100 to there provide a space for excess flash to accumulate thereby preventing accumulation of such material in the lower injection port itself. This undercut region 108 preferably extends straight across the heel region only and does not continue around the periphery of the sole plate. With such undercut region any excess flash material which finds its way past groove 100 would enter the space between surfaces 105 and 106 and might as a result of movement of the sole plate be pressed by the surface 105 into the second injection port 16. The undercut 108, however, permits such excess flash to loosely hang away from the entrance of the injection port thus substantially reducing the risk that such material will be forced into the injection port 16 where it could later intermix with the second injected material.

It will furthermore be seen that while, in the preferred embodiment, both the lip 101 and the groove 100 have been shown as being continuous around the periphery of the sole plate, a construction may be possible, without departing from the scope of the present invention, in which the rubber material at the region 104 will be sufficiently thin so as to produce a circumferentially extending tear even where, instead of a continuous groove 100, the sole plate is provided with a plurality of sufficiently closely spaced recesses distributed about the periphery thereof.

While particular embodiments of this invention have been shown and described, it will be obvious to those skilled in the art that various changes and modifications may be made without departing from this invention in its broader aspects, and it is, therefore, intended in the appended claims to cover all such changes and modifications as fall within the true spirit and scope of this invention.

Having thus described the invention, what is claimed and desired to be protected by Letters Patent is:

1. In an apparatus for injection molding during the manufacture of rubber-soled footwear, in combination:

moldside ring means surrounding and defining part of a predetermined cavity adapted to be closed at an upper portion by a lasted upper;
a sole plate surrounded by and slidingly engaging said side ring means;
means for collecting excess material and for severing the collected material from the molded article, said means including a lip on said sole plate extending toward and into close proximity of said side ring means and means on the peripheral wall of said sole plate adjacent said lip, but on that side of said lip which is facing away from said lasted upper, for forming into a peripherally extending bead that portion of the midsole rubber which escapes between said lip and said side ring means during the molding operation, and means coacting with said sole plate for retracting said sole plate away from said upper after said molding operation for severing from the molded article the bead of excess material.

2. The apparatus according to claim 1 wherein the configuration of said lip is such as to form a peripherally extending weakened section in the portion of said first rubber which depends from said midsole after said application of said midsole rubber to said lasted upper, whereby said rubber is torn along said weakened section in response to said initial retraction of said sole plate, during which the bead-shaped rubber is entrained by said bead forming means to move with the sole plate in a direction away from said upper.

3. In an apparatus for molding rubber onto an article, wherein mold side ring means surround and define part of a predetermined cavity adapted to have unvulcanized rubber deposited therein, said cavity being adapted to be closed at one end by said article and having a movable mold member surrounded by and slideably received in said mold side ring means and adapted to be advanced toward and retracted from said article within said cavity, the improvement comprising:

means for collecting excess material and for severing the collected material from the molded article, said means including forming means provided at the periphery of said movable mold member and extending circumferentially thereabout and adpated to form in the rubber which escapes between said movable mold member and said ring means, in response to advance of said movable mold member, a peripherally extending weakened portion, collecting means on said movable mold member coextensive with said forming means for collecting and entraining therein that portion of said rubber which escapes past said forming means, and operating means coacting with said movable mold member for retracting the latter away from said molded article whereby said excess material entrained by said collecting means is severed from the molded article.

4. The apparatus according to claim 3 said forming means comprising a substantially continuous peripheral lip extending outwardly toward and into sliding contact with said mold side ring means surrounding the latter, said lip being adapted to form a weakened peripherally extending region in the rubber flash material escaping from said cavity between said lip and said side ring means; and said collecting means including a substantially peripherally extending groove, in said movable mold member, adjacent said lip on the side thereof facing away from said article, said groove opening towards said side wall means so that flash rubber escaping from said cavity past said lip will be collected in said groove in the form of a peripherally extending bead, whereby the rubber flash will be torn along said weakened peripherally extending region thereof in response to such retraction movement.

* * * * *